United States Patent [19]

Swartz et al.

[11] Patent Number: 5,215,139
[45] Date of Patent: Jun. 1, 1993

[54] METHOD AND MOLD FOR ALUMINOTHERMIC WELDING OF RAILS

[75] Inventors: Mark A. Swartz, Brick; Thomas J. Wooley, Wooley; Robert H. Kachik, Lakehurst, all of N.J.

[73] Assignee: Orgo-Thermit Inc., Lakehurst, N.J.

[21] Appl. No.: 789,368

[22] Filed: Nov. 8, 1991

[51] Int. Cl.⁵ .............................................. B23K 23/00
[52] U.S. Cl. ................................. 164/54; 164/529; 164/138; 249/86
[58] Field of Search ...................... 164/54, 529, 138; 249/86

[56] References Cited

U.S. PATENT DOCUMENTS

| | | | |
|---|---|---|---|
| 3,007,217 | 11/1961 | Ahlert | 164/54 |
| 3,856,076 | 12/1974 | Adams et al. | 164/54 |

FOREIGN PATENT DOCUMENTS

| | | | |
|---|---|---|---|
| 3207170 | 11/1982 | Fed. Rep. of Germany | 164/138 |
| 3825250 | 2/1989 | Fed. Rep. of Germany | 164/529 |

Primary Examiner—Kuang Y. Lin
Attorney, Agent, or Firm—Anderson Kill Olick & Oshinsky

[57] ABSTRACT

In forming an aluminothermic weld between adjoining rail ends, a sand mold is arranged around the rail ends disposed in spaced relation. The sand mold is formed at least in part of silica sand. The surface of the mold in contact with the rail ends and enclosing the space between the rail ends is formed of one of a combination of silica sand and zircon sand, a layer of zircon sand inwardly from a layer of silica sand, or a thin layer of a zircon mold wash on a surface formed of silica sand.

10 Claims, 3 Drawing Sheets

METHOD AND MOLD FOR ALUMINOTHERMIC WELDING OF RAILS

BACKGROUND OF THE INVENTION

The present invention is directed to a method of and mold for the aluminothermic welding of rails. Rails to be aluminothermically welded are enclosed in a sand mold so that the mold extends over the adjoining rail ends and encloses the space between the ends. The sand mold is formed of silica sand. The aluminothermic reaction takes place in a crucible located above the mold and superheated molten metal from the reaction is tapped into the space between the rail ends.

At the present time, in the railroad industry extensive maintenance and repair of the track is required. As a part of the maintenance program, worn or damaged rails are removed and replaced with new rails. To provide a continuous surface, the new rails are joined to existing rails by welding to form a surface affording a smoother ride and greatly reducing the battering of the rail ends which occurs when the ends are connected together by joint bars. Other types of rail, such as crane rails, are also welded together.

In the past, several methods including aluminothermic welding have been used for welding rails in the field. Aluminothermic welding is used extensively because of its general simplicity and low cost. The equipment required is inexpensive, it is readily portable to remote areas, and workers can be trained in a relatively short time to make satisfactory aluminothermic welds.

In preparation for aluminothermic welding, rail ends are aligned and separated by a gap of approximately one inch. A silica sand mold is placed around the rail ends and encloses the gap. Initially, the rail ends are preheated with a burner. Subsequently, the aluminothermic material is ignited in the crucible located above the mold and the superheated weld metal is tapped into the gap between the rail ends to form the weld. After a relatively short time, the sand mold is removed and excess weld metal is sheared and ground off leaving the weld metal joint ready for use.

One of the problems experienced with aluminothermic welds is that the weld metal has about twice the superheat of normal molten steel during teeming and, as a result, attacks the surfaces of the mold in direct contact with the rail ends. Due to the superheat, pockmarks and other surface defects are formed in the sides or collar of the weld metal. Any visible imperfections in the weld collar cause concern about the general quality of the weld and/or its subsequent fatigue life. It has been standard practice with some railway companies that the collar defects and/or the entire collar are removed by hand-held grinding tools. Manual grinding of the aluminothermic weld collars is tedious, costly and time consuming.

SUMMARY OF THE INVENTION

Therefore, the primary object of the present invention is to provide a method of and a mold for forming aluminothermic welds between adjoining rail ends where the imperfections in the collar of the weld are eliminated and the need to grind the collar is obviated.

In one embodiment of the present invention, a silica sand mold is used where about 50 to 100% of the silica sand is replaced by zircon sand, a more refractory material. Other possible refractory materials for replacing at least a part of the silica sand are aluminum oxide, magnesium oxide, and the like. It is expected that the replacement of silica sand with these other more refractory materials would afford the same benefit.

In another embodiment, a composite mold is formed with the bulk of the mold constructed of normal silica sand, but with the working face or surface of the mold in direct contact with the welding material afforded by a relatively thick layer of one of the more refractory materials mentioned above. The composite mold is prepared by installing the more refractory material in the mold pattern just before the bulk of the normal mold mixture is introduced.

In still another embodiment of the invention, the surfaces of a conventional sand mold, intended to contact the rail ends and welding metal, are sprayed or painted with a slurry consisting of a more refractory material in a suitable liquid vehicle. In this case, a relatively thin layer of the more refractory material is applied to the surface of the mold facing the weld joint.

In these different embodiments the improved refractory effect, as compared to normal silica sand, avoids the development of visible imperfections in the weld metal collar. As a result, there is limited finishing work to be performed on the weld joint after the mold is removed.

A series of molds were prepared wherein 100%, 50% and 25% of the normally used silica sand was replaced with zircon sand. The binder material was the normally used waterglass. These molds were used to form weld joints between adjoining rail ends and the weld collars were closely examined for surface imperfections. The welds made with 100% and 50% zircon sand molds displayed essentially no collar imperfections, however, the welds produced with molds containing 0 to 25% zircon sand exhibited varying degrees of usual collar imperfections. Accordingly, sand molds containing in excess of 25% to 100% zircon sand appear to avoid the presence of surface imperfections in the weld collar formed in an aluminothermic weld.

Up to the present time tests have not been conducted where a relatively thick layer of a more refractory material, such as zircon sand, forms the contact face of the mold with the weld joint, however, in consideration of the above mentioned tests it is expected that similar results would be obtained.

A number of normal silica molds were formed and the contacting surfaces of the mold with the rail ends and the weld joint were painted with a relatively thin layer of a commercially available zircon mold wash. The layer has a thickness of approximately 0.020 inches and the material used was obtained from the International Foundry Supply, Inc. and its identification code is IFS Z-A PREMIX. A test weld produced with such a mold resulted in an essentially imperfection free weld collar. Subsequently, additional aluminothermic welds have been produced using the zircon mold wash and have resulted in substantial improvement in the quality of the weld collar. Another series of ten tests were conducted with an IFS ZK-W PREMIX, and again the weld collars exhibited minimal surface imperfections. On the basis of these tests and additional tests at a customer location, the customer has adopted the practice and no longer removes the entire weld collar by grinding. It is expected that other mold washes affording an improved refractory effect as compared to silica sand would be equally effective.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
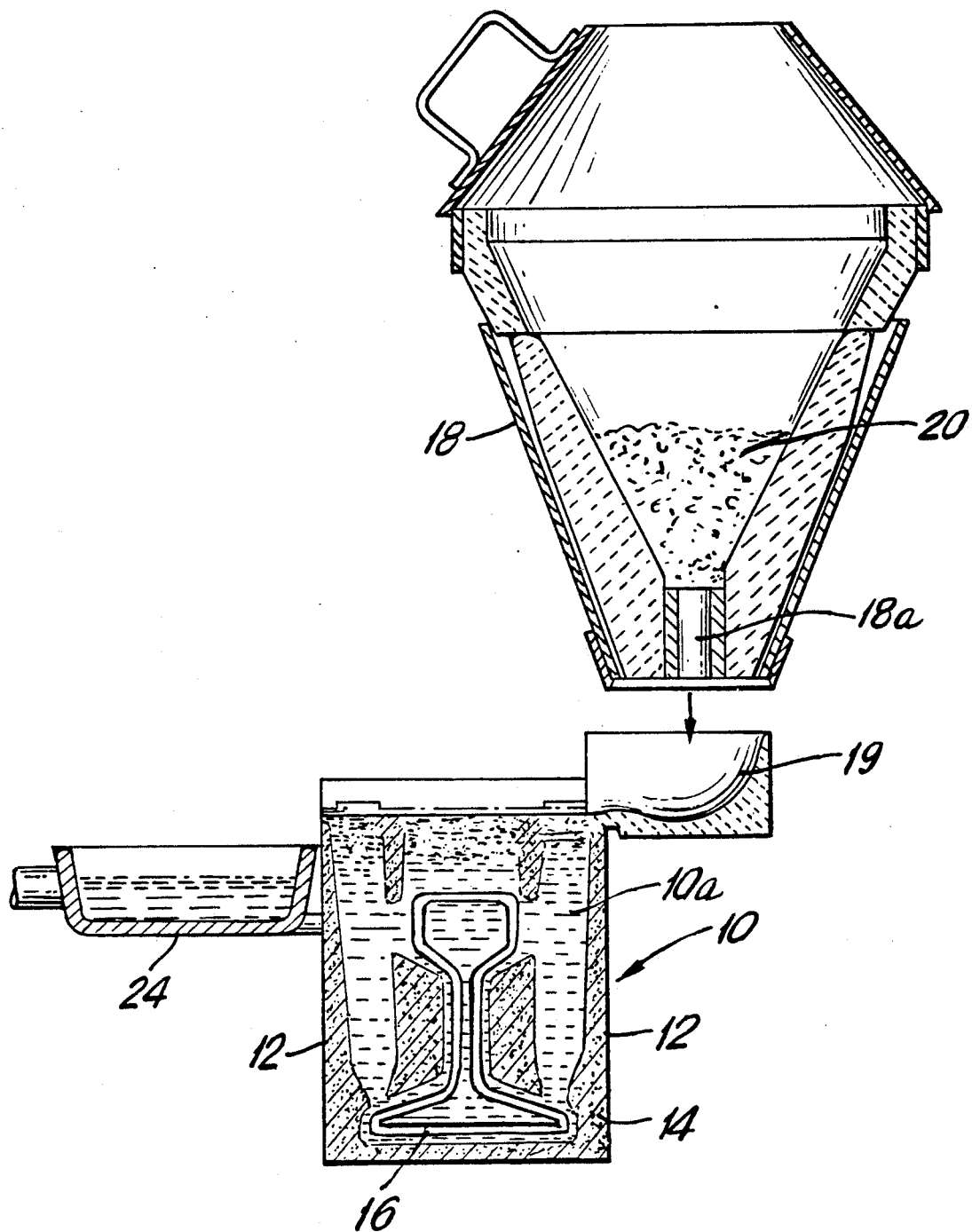
FIG. 1 is a transverse sectional view of a mold for forming an aluminothermic weld between adjoining rail ends illustrating one embodiment of the present invention.

In FIG. 1 a sand mold 10 is shown formed by two mold halves 12, 12. The mold halves 12, 12 are formed of a mixture of conventional silica sand and zircon sand. It is possible that the mold halves could be formed completely of zircon sand, however, for an effective mold the zircon sand can be in the range of approximately 40% to 100%. It has been found in testing, as indicated above, that sand molds containing in the range of 0 to 25% zircon sand do not avoid the development of collar imperfections similar to those in a conventional silica sand mold.

For forming the aluminothermic weld between adjoining rail ends 16, the rail ends are spaced approximately one inch apart. The mold halves 12, 12 are then applied to enclose the rail ends 16, 16 and the gap. The rail ends are then preheated with a burner. A crucible 18 is suspended above the sand mold and contains an aluminothermic material mixture 20 comprised of iron oxide, aluminum, steel punchings and ferroalloys. After the aluminothermic mixture is ignited and becomes molten, a plug 18a, in the base of the crucible, is melted and the superheated molten steel flows into a pouring spout 19 and then into the space between the rail ends forming the welded joint.

The mold 10 has flow passages 10a for conveying the molten steel to different locations in the gap between the rail ends 16, 16. A slag pan 24 is attached to the mold for receiving slag. Excess molten metal can flow out of the mold 10 into the slag pan 24.

After the aluminothermic weld joint solidifies and cools, the sand mold is removed. The surface of the rails on which wheels travel can be worked to provide a smooth traveling surface. Since the surfaces of the sand mold contacting the rail ends and defining the weld joint are formed of a combination of the silica sand and zircon sand, minimal visible imperfections are present after the mold is stripped.

Other materials, such as aluminum oxide, magnesium oxide and the like, can be used in place of the zircon sand with the same beneficial effect.

Figure 2:
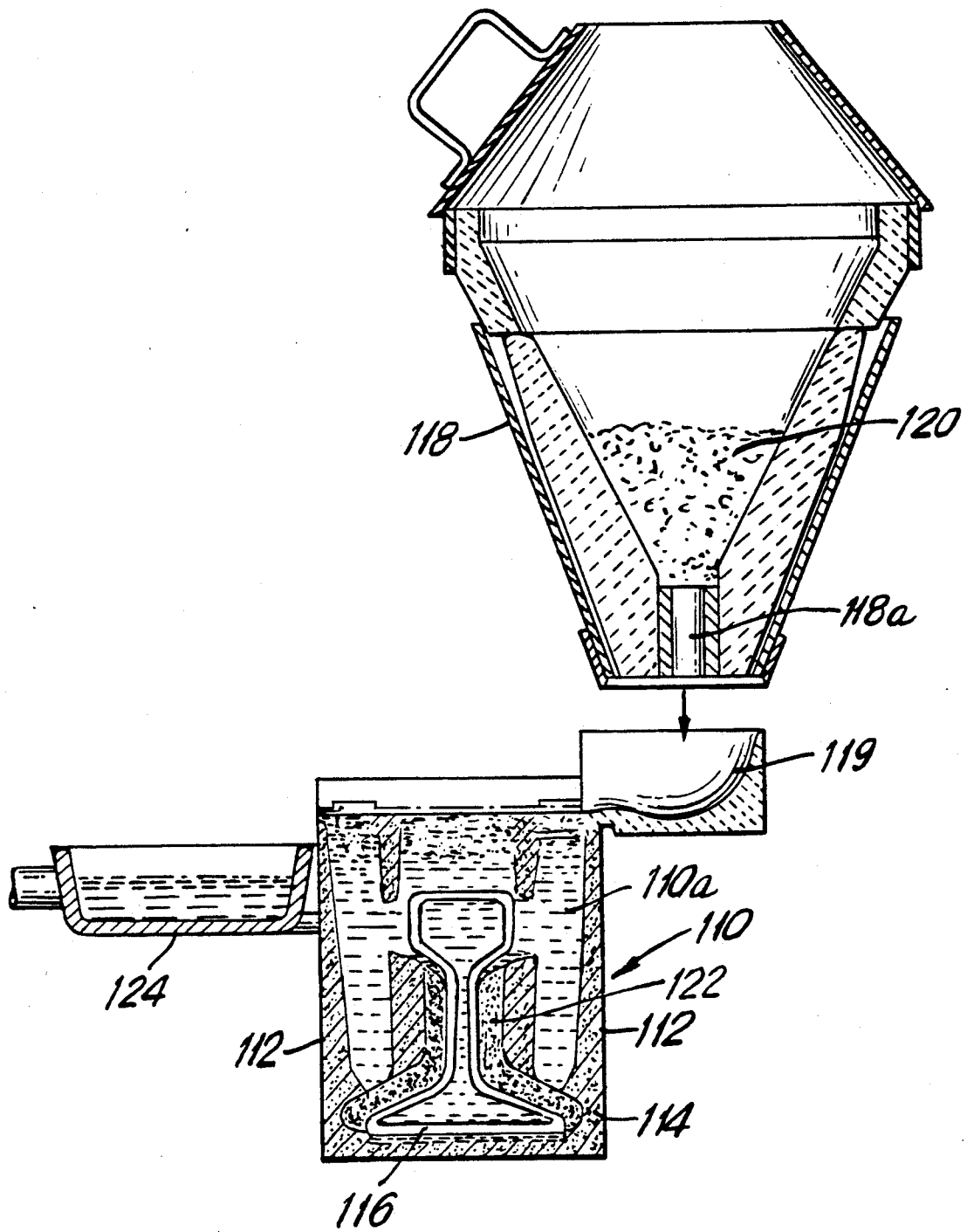
FIG. 2 is a view similar to FIG. 1, however, showing another embodiment of the mold.

In FIG. 2 the sand mold 110 is similar to the mold in FIG. 1, however, the reference numerals have been provided with a prefix 1. The mold 110 is formed of two mold halves 112, 112 enclosing adjoining rail ends 116. The aluminothermic mixture 120 is held within a crucible 118 so that it can flow through passages 122 into the space between the rail ends after the mixture is ignited.

The sand mold 110 is formed of an outer layer of silica sand 114 and an inner layer 122 of a material having a more refractory characteristic than silica sand, such as zircon sand, aluminum oxide, magnesium oxide and the like. The silica sand layer has a thickness of approximately 2 to 4 inches while the inner layer of the more refractory material has a thickness of approximately 0.5 inches.

When the aluminothermic mixture 120 is ignited and flows from the crucible 118 through the mold passages 110a into the space between the rail ends 116, 116, since the contacting surface of the mold is formed of a more refractory material than silica sand, the resulting weld collar is virtually free of visible imperfections and the amount of finishing work required for the weld joint is limited.

Figure 3:
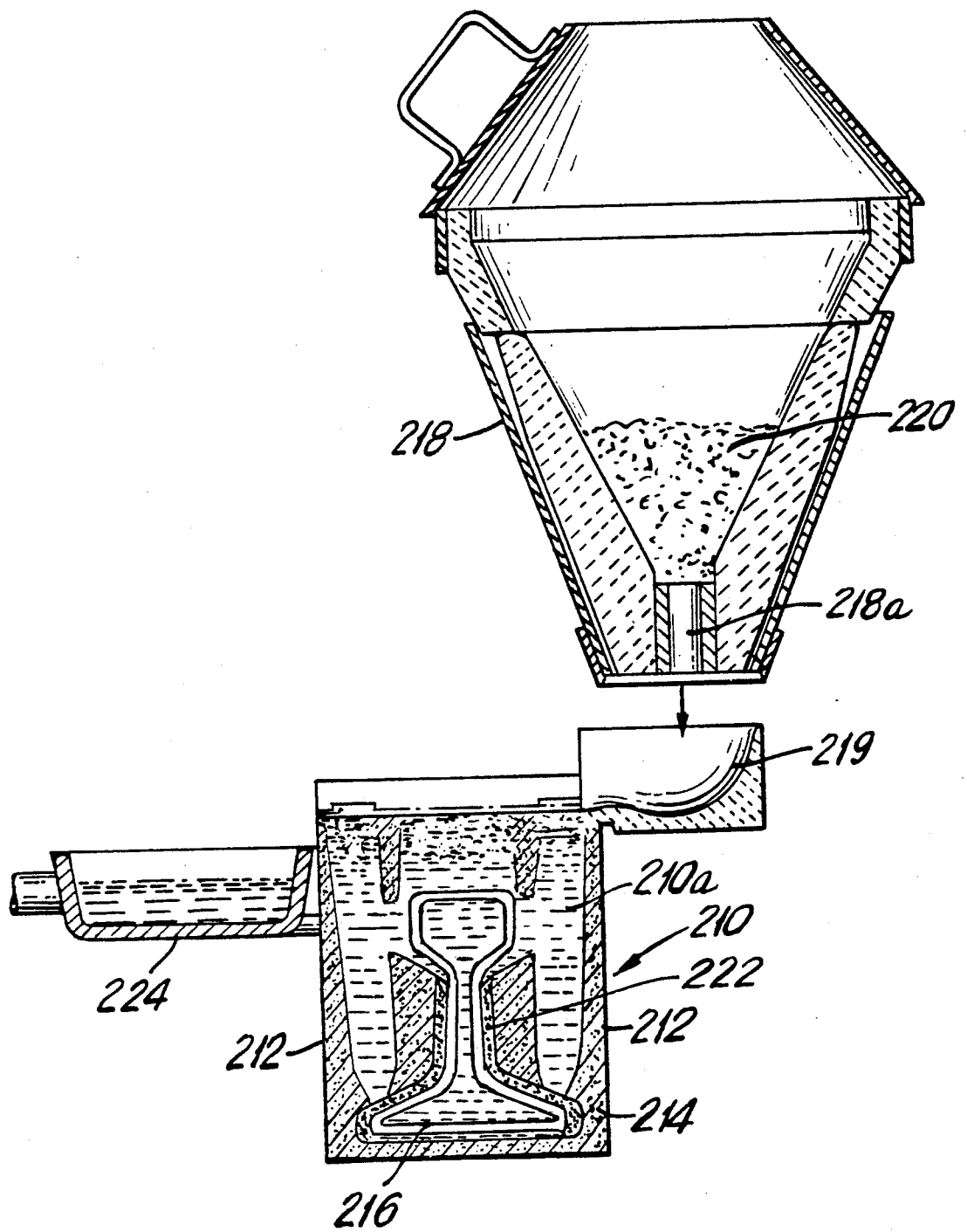
FIG. 3 is a view similar to FIG. 1 illustrating still another embodiment of the present invention.

In FIG. 3 another silica sand mold 210 similar to the sand molds in FIGS. 1 and 2 is illustrated formed of similar parts, however, as compared to FIG. 1 the reference numerals are the same but with the addition of a prefix 2. The sand mold 210 is formed of two mold halves 212, 212 with the mold halves formed of silica sand with the surfaces of the mold halves in contact with the rail ends 216 and the aluminothermic weld formed by a layer 222 of a commercially available zircon mold wash. The silica sand mold has a wall thickness of approximately 2 to 4 inches while the zircon mold wash layer 222 has a thickness of approximately 0.020 inches. As mentioned above, using such a sand mold painted with a mold wash of a more refractory material than silica sand, it is possible to form the aluminothermic weld collar virtually free of visible imperfections.

The procedure for forming the weld is similar for each of the embodiments shown in FIGS. 1, 2 and 3. Initially the mold halves 12, 12; 112, 112; 212, 212 are placed around the adjoining rail ends 16, 116, 216 bridging the space between the rail ends to be filled by the molten aluminothermic weld metal. The mold halves are clamped together by conventional means well known in the aluminothermic weld art, not shown. A plug 18a, 118a, 218a is placed in the bottom of the crucible 18, 118, 218 and then the required amount of aluminothermic mixture 20, 120, 220 is introduced into the crucible. The aluminothermic mixture is ignited by conventional means and after the plug 18a, 118a, 218a is melted by the superheated molten aluminothermic metal, the metal flows through the passages 10a, 110a, 210a into the space between the rail ends 16, 16; 116, 116, 216 216 and forms the weld securing the ends together. Prior to igniting the aluminothermic mixture the rail ends can be heated with burners. Excess molten metal flows out of the mold 10, 110, 210 into the slag pan 24, 124, 224.

After the molten metal has set, usually within four minutes, the sand mold is stripped from the rail ends and the weld joint, and any necessary finishing of the weld joint is performed. As compared to conventional silica sand molds, the molds formed in accordance with the present invention at least reduce if not eliminate the imperfections in the surface of the weld collar which could have a deleterious effect on the weld.

While specific embodiments of the invention have been shown and described in detail to illustrate the application of the inventive principles, it will be understood that the invention may be embodied otherwise without departing from such principles.

We claim:

1. A method of forming an aluminothermic weld for joining rail ends comprises the steps of placing the rail ends in aligned adjoining spaced relation, placing a sand mold around the rail ends and the space therebetween, forming the sand mold at least in part as a conventional sand mold of silica sand and providing a surface in the sand mold for contacting the rail ends and a weld joint in the space therebetween made up at least in part of a more refractory material than silica sand whereby the surface contacting the rail ends and the weld joint therebetween has a more refractory characteristic than silica sand, forming the sand mold of a mixture of silica sand and a material having a more refractory characteristic than silica sand, and using zircon sand in combination with the silica sand with the zircon sand forming approximately 40 to 100% of the sand mold.

2. A method of forming an aluminothermic weld for joining rail ends comprises the steps of placing the rail ends in aligned adjoining spaced relation, placing a sand mold around the rail ends and the space therebetween, forming the sand mold at least in part as a conventional sand mold of silica sand and providing a surface in the sand mold for contracting the rail ends and a weld joint in the space therebetween made up at least in part of a more refractory material than silica sand whereby the surface contacting the rail ends and the weld joint therebetween has a more refractory characteristic than silica sand, forming the sand mold of a mixture of silica sand and a material having a more refractory characteristic than silica sand, and using one of aluminum oxide or magnesium oxide in combination with the silica sand as the mixture.

3. A method of forming an aluminothermic weld for joining rail ends comprises the steps of placing the rail ends in aligned adjoining spaced relation, placing a sand mold around the rail ends and the space therebetween, forming the sand mold at least in part as a conventional sand mold of silica sand and providing a surface in the sand mold for contacting the rail ends and a weld joint in the space therebetween made up at least in part of a more refractory material than silica sand whereby the surface contacting the rail ends and the weld joint therebetween has a more refractory characteristic than silica sand, forming the silica sand mold of an outer layer of silica sand and of an inner layer arranged to contact the surface of the rail ends and the weld joint made up of a more refractory material than silica sand, and forming said outer layer of silica sand with a thickness in the range of 2 to 4 inches and the inner layer of zircon sand with a thickness in the range of 0.25 to 1.5 inches.

4. A method of forming an aluminothermic weld for joining rail ends comprises the steps of placing the rail ends in aligned adjoining spaced relation, placing a sand mold around the rail ends and the space therebetween, forming the sand mold at least in part as a conventional sand mold of silica sand and providing a surface in the sand mold for contacting the rail ends and a weld joint in the space therebetween made up at least in part of a more refractory material than silica sand whereby the surface contacting the rail ends and the weld joint therebetween has a more refractory characteristic than silica sand, forming the sand mold of a mixture of silica sand and a material having a more refractory characteristic than silica sand, and painting the surface in the sand mold contacting the rail ends and the weld joint with a zircon mold wash.

5. A welding apparatus for use in aluminothermic welding adjoining spaced rail ends, comprising a sand mold arranged to enclose the rail ends and an open joint between the rail ends, a crucible suspended above the sand mold for holding an aluminothermic mixture and effecting an aluminothermic reaction, said crucible arranged for flowing molten aluminothermic metal from the crucible to the open joint between the rail ends, the sand mold is formed at least in part of silica sand with a layer arranged to contact the aluminothermic weld metal formed at least in part of a material with a refractory characteristic greater than silica sand, and said layer in contact with the aluminothermic weld metal is formed of a combination of silica sand and zircon sand with the zircon sand being in the range of 40% to 100% of the silica sand.

6. A welding apparatus for use in aluminothermic welding adjoining spaced rail ends, comprising a sand mold arranged to enclose the rail ends and an open joint between the rail ends, a crucible suspended above the sand mold for holding an aluminothermic mixture and effecting an aluminothermic reaction, said crucible arranged for flowing molten aluminothermic metal from the crucible to the open joint between the rail ends, the sand mold is formed at least in part of silica sand with a layer arranged to contact the aluminothermic weld metal formed at least in part of a material with a refractory characteristic greater than silica sand, the layer in contact with the aluminothermic weld metal is formed of an inner layer of a material with a refractory characteristic greater than silica sand and an outer layer formed of silica sand, and said inner layer is formed of zircon sand.

7. A welding apparatus for use in aluminothermic welding adjoining spaced rail ends, comprising a sand mold arranged to enclose the rail ends and an open joint between the rail ends, a crucible suspended above the sand mold for holding an aluminothermic mixture and effecting an aluminothermic reaction, said crucible arranged for flowing molten aluminothermic metal from the crucible to the open joint between the rail ends, the sand mold is formed at least in part of silica sand with a layer arranged to contact the aluminothermic weld metal formed at least in part of a material with a refractory characteristic greater than silica sand, the layer in contact with the aluminothermic weld metal is formed of an inner layer of a material with a refractory characteristic greater than silica sand and an outer layer formed of silica sand, and said inner layer is formed of aluminum oxide.

8. A welding apparatus for use in aluminothermic welding adjoining spaced rail ends, comprising a sand mold arranged to enclose the rail ends and an open joint between the rail ends, a crucible suspended above the sand mold for holding an aluminothermic mixture and effecting an aluminothermic reaction, said crucible arranged for flowing molten aluminothermic metal from the crucible to the open joint between the rail ends, the sand mold is formed at least in part of silica sand with a layer arranged to contact the aluminothermic weld metal formed at least in part of a material with a refractory characteristic greater than silica sand, and the layer in contact with the aluminothermic weld metal is formed of an inner layer of a material with a refractory characteristic greater than silica sand and an outer layer formed of silica sand, and said inner layer is formed of magnesium oxide.

9. A welding apparatus for use in aluminothermic welding adjoining spaced rail ends, comprising a sand mold arranged to enclose the rail ends and an open joint between the rail ends, a crucible suspended above the sand mold for holding an aluminothermic mixture and effecting an aluminothermic reaction, said crucible arranged for flowing molten aluminothermic metal from the crucible to the open joint between the rail ends, the sand mold is formed at least in part of silica sand with a layer arranged to contact the aluminothermic weld metal formed at least in part of a material with a refractory characteristic greater than silica sand, said inner layer in contact with the aluminothermic weld metal comprises a thin layer of mold wash having a refractory characteristic greater than silica sand, and said inner layer is formed of a zircon mold wash.

10. A welding apparatus for use in aluminothermic welding adjoining spaced rail ends, comprising a sand mold arranged to enclose the rail ends and an open joint between the rail ends, a crucible suspended above the sand mold for holding an aluminothermic mixture and effecting an aluminothermic reaction, said crucible arranged for flowing molten aluminothermic metal from the crucible to the open joint between the rail ends, the sand mold is formed at least in part of silica sand with a layer arranged to contact the aluminothermic weld metal formed at least in part of a material with a refractory characteristic greater than silica sand, said inner layer in contact with the aluminothermic weld metal comprises a thin layer of a mold wash having a refractory characteristic greater than silica sand, and said inner layer is formed of a mold wash of at least one of aluminum oxide and magnesium oxide.

* * * * *